(12) United States Patent
Weber

(10) Patent No.: US 11,174,909 B2
(45) Date of Patent: Nov. 16, 2021

(54) CONNECTION DEVICE AND METHOD FOR CONNECTING A BRAKE DISK TO A WHEEL HUB

(71) Applicant: SAF-HOLLAND GmbH, Bessenbach (DE)

(72) Inventor: Elmar Weber, Dülmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 76 days.

(21) Appl. No.: 16/498,173

(22) PCT Filed: Mar. 21, 2018

(86) PCT No.: PCT/EP2018/057175
§ 371 (c)(1),
(2) Date: Sep. 26, 2019

(87) PCT Pub. No.: WO2018/177843
PCT Pub. Date: Oct. 4, 2018

(65) Prior Publication Data
US 2020/0040954 A1    Feb. 6, 2020

(30) Foreign Application Priority Data

Mar. 27, 2017   (DE) .................... 10 2017 106 461.3

(51) Int. Cl.
*F16D 65/12* (2006.01)
*B60B 27/00* (2006.01)
*F16D 65/02* (2006.01)

(52) U.S. Cl.
CPC ...... *F16D 65/123* (2013.01); *F16D 2065/136* (2013.01); *F16D 2065/1316* (2013.01); *F16D 2065/1384* (2013.01); *F16D 2065/1392* (2013.01)

(58) Field of Classification Search
CPC . B60B 3/16; B60B 27/00; F16D 65/12; F16D 65/123; F16D 65/125; F16D 65/128
USPC ......................................... 188/18 A, 218 XL
See application file for complete search history.

(56) References Cited

U.S. PATENT DOCUMENTS

| | | | | |
|---|---|---|---|---|
| 3,212,393 | A | * | 10/1965 | Waeltz ..................... F16B 39/24 411/371.2 |
| 3,767,221 | A | * | 10/1973 | Asberg ................ B60B 27/0005 280/105 |
| 4,102,443 | A | | 7/1978 | Kohler et al. |
| 4,280,598 | A | * | 7/1981 | Pollinger .............. F16D 65/123 188/218 XL |

(Continued)

FOREIGN PATENT DOCUMENTS

| | | |
|---|---|---|
| DE | 19544559 C1 | 7/1997 |
| DE | 19617154 A1 | 11/1997 |

(Continued)

OTHER PUBLICATIONS

European Patent Office; International Search Report; dated Jul. 3, 2018.

*Primary Examiner* — Christopher P Schwartz
(74) *Attorney, Agent, or Firm* — Price Heneveld LLP

(57) ABSTRACT

A connection device for connecting a brake disk to a wheel hub, wherein the connection device is arrangeable at least in part in a recess of the wheel hub and is transferable into a fixed state in which the connection device interacts in a non-positive locking manner with the recess.

20 Claims, 3 Drawing Sheets

(56) References Cited

U.S. PATENT DOCUMENTS

| | | | | |
|---|---|---|---|---|
| 4,807,728 | A * | 2/1989 | Suenaga | B22D 15/00 164/99 |
| 4,919,577 | A * | 4/1990 | Binns | F16B 19/1063 411/34 |
| 5,190,124 | A * | 3/1993 | Haneda | F16D 65/123 188/18 A |
| 5,918,707 | A * | 7/1999 | Saunders, III | B60B 3/145 188/18 A |
| 5,988,761 | A * | 11/1999 | Visser | B60B 3/16 188/218 XL |
| 6,076,896 | A * | 6/2000 | Bertetti | B60B 27/00 188/18 A |
| 6,116,386 | A * | 9/2000 | Martin | F16D 65/123 188/218 XL |
| 6,374,956 | B1 * | 4/2002 | Naeumann | F16D 55/40 188/18 A |
| 6,988,598 | B2 * | 1/2006 | Williams | F16D 65/12 188/18 A |
| 2002/0157908 | A1 * | 10/2002 | Burgoon | F16D 65/12 188/218 XL |
| 2004/0031651 | A1 * | 2/2004 | Lehmann | F16D 65/12 188/218 XL |
| 2010/0307875 | A1 * | 12/2010 | Ilg | F16D 65/123 188/218 XL |
| 2012/0175202 | A1 * | 7/2012 | Pahle | F16D 65/123 188/218 XL |
| 2016/0025166 | A1 * | 1/2016 | Plantan | F16D 65/123 188/218 XL |
| 2016/0280006 | A1 * | 9/2016 | Pahle | B60B 27/001 |

FOREIGN PATENT DOCUMENTS

| | | |
|---|---|---|
| DE | 19815807 A1 | 10/1998 |
| DE | 10262070 A1 | 1/2005 |
| DE | 10351592 B3 | 4/2005 |
| DE | 102007040143 A1 | 2/2009 |
| DE | 102012021577 A1 | 5/2014 |
| EP | 0127935 A1 | 12/1984 |
| EP | 0235382 A1 | 9/1987 |
| WO | 0196758 A1 | 12/2001 |
| WO | 0238979 A1 | 5/2002 |

\* cited by examiner

CONNECTION DEVICE AND METHOD FOR CONNECTING A BRAKE DISK TO A WHEEL HUB

BACKGROUND OF THE INVENTION

The present invention relates to a connection device for connecting a brake disk to a wheel hub, as well as to a system produced from a wheel hub, a brake disk and a connection device and to a method for connecting a brake disk to a wheel hub.

Wheel bearing devices for the bearing arrangement of vehicle wheels have been disclosed sufficiently in the prior art. Essential component parts of such wheel bearing devices are a wheel hub and a brake disk which is connected non-detachably to the wheel hub. The wheel hub typically rotates about a wheel axle in operation, in this connection, and in a braking situation the brake disk interacts with brake shoes. In particular in the case of commercial vehicles, such as, for example, a semitrailer, it is of utmost importance for safety reasons to secure a connection, which is adapted to the expected load, between the brake disk and the wheel hub.

To this end, the brake disk is screw-connected to the wheel hub, which involves a costly realization in the wheel hub of a recess which comprises an internal thread.

It is consequently the object of the present invention to provide a connection device by way of which, on the one hand, a connection is able to be produced between the brake disk and the wheel hub without jeopardizing, on the other hand, the necessary loading capacity of the connection created.

SUMMARY OF THE INVENTION

A connection device for connecting a brake disk to a wheel hub is provided according to the invention, wherein the connection device is arrangeable at least in part in a recess of the wheel hub and is transferable into a fixed state in which the connection device interacts in a non-positive locking manner with the recess. Compared to the prior art, it is advantageous in the case of the connection device according to the invention that it is possible to dispense with an internal thread in the recess as a result of the non-positive locking connection between the connection device and the inner side of the recess. The recess is consequently advantageously thread-free. As a result, an operating step can be saved in an advantageous manner in the production of the hub. In particular, it is provided that the connection device, or the part of the connection device arranged in the recess, interacts in the mounted state in the axial direction in a non-positive locking or frictional locking manner, preferably exclusively in a non-positive locking or frictional locking manner, with the inner side of the recess. The recess in the wheel hub is preferably designed in a circular manner in a primary cutting plane which extends perpendicularly to the wheel hub. Such a recess can be realized in an advantageous manner by means of simple boring. As an alternative to this, it is also conceivable for the cross section of the recess to be designed in a polygonal manner, for example as a pentagon or hexagon, in order to avoid rotation of the connection device. To this end, the outer contour of the part of the connection device that is placed in the recess in the mounted state is designed complementarily to the development of the inner side of the recess. The outer contour of the connection device and the development of the inner side of the recess are preferably designed in line with a lock and key principle in such a manner that when the connection device is inserted into the recess, the connection device is automatically aligned, in particular part of the connection device which is arranged outside the recess in the mounted state, is aligned. In addition, it is conceivable for the recess in the wheel hub to be tapered in the axial direction, in particular conically tapered, and for the part of the connection device to be placed in the recess on assembly to be designed in a corresponding manner at least in regions.

According to a further embodiment of the present invention, it is provided that the recess in the wheel hub is designed free of undercuts, in particular free of threads, and the connection device is insertable into the recess, preferably with a precision fit, in a basic state. In particular, an outer circumference of the connection device is smaller in the basic state at least in regions than in the fixed state. In other words: in order to provide a non-positive locking abutment in the recess, the connection device is deformed such that there is non-positive locking contact with the inner side of the recess. It is provided in a particularly preferred manner that the connection device is designed in such a manner that a non-positive locking attachment to the inner side of the recess is effected in a primary cutting plane, which extends perpendicularly to the wheel axle with the connection device in the mounted state, at least along a closed line on the outer circumference of the connection device. It is also conceivable for the regions, in which a non-positive locking connection is formed between the connection device and the inner side of the recess in the fixed state, to be interrupted. This is realized, for example, by slots which extend axially in the connection device in the mounted state. In a preferred manner, in the primary cutting plane the ratio between the regions in which a non-positive locking attachment to the inner side is effected and the entire circumference of the inner side of the recess in the primary cutting plane is between 0.6 and 0.95, in a preferred manner 0.75 to 0.9 and particularly preferred between 0.83 and 0.87. In particular, it has been shown that a sturdy, non-positive locking attachment can be set up and the connection device, when transferring into the fixed state, can be deformed at the same time in a comparatively simple manner for the value ranges between 0.83 and 0.87.

It is provided in an expedient manner that the connection device comprises an adapter element for the positive locking attachment of the brake disk to the connection device. It is provided, in particular, that the side of the adapter element facing the brake disk in the mounted state is designed for coupling with the brake disk. In this case, the connection device includes an adapter-side coupling region which is designed complementarily to a brake-side coupling region. In a preferred manner, the adapter-side coupling region and the brake-side coupling region are designed in line with the lock and key principle. As a result, it can be ensured in an advantageous manner that the brake disk provided for the respective loads is used with the corresponding connection device.

It is provided in an expedient manner that the adapter element comprises a sleeve-shaped primary region for insertion into the recess. The sleeve-shaped primary region is proven to be advantageous, in particular, because it allows for access to a sleeve interior and consequently for the adapter element arranged within the recess to be deformed outward. In this case, the primary region is preferably designed in such a manner that it can be sunk completely in the recess.

In addition, it is conceivable for the sleeve-shaped primary region to comprise a surface modification on its side facing the inner side of the recess in the mounted state in order to support the non-positive locking connection after deformation. The surface modification is preferably designed as a roughening and/or a rib structure. For example, the rib structure protrudes, for example as a circumferential groove, radially from the sleeve-shaped primary region and surrounds the same in a closed or interrupted manner. As a result, the connection between the wheel hub and the brake disk can be further improved by means of the connection device.

It is provided in a preferred manner that the connection device includes an adapter element with multiple primary regions, wherein the primary regions are each insertable into a recess. As a result, multiple primary regions can be inserted into multiple recesses at the same time, as a result of which the assembly of the connection device is advantageously simplified.

It is preferably provided that the multiple primary regions are connected to one another by means of a ring-shaped or ring-segment-shaped carrier element. In this case, the sleeve-shaped primary regions preferably protrude substantially perpendicularly from the carrier element and are arranged with respect to one another corresponding to the respective distribution of the recesses in the wheel hub. To save weight, the carrier element preferably comprises empty spaces between the primary regions, when viewed in the circumferential direction. It is also conceivable for multiple adapter elements to be arranged detachably on the carrier element. The carrier element can then be utilized during assembly for the simultaneous insertion of multiple adapter elements and then can be removed again after insertion and prior to final fixing of the brake disk. As a result, weight can be saved in the finished connection between the brake disk and the wheel hub in an advantageous manner and at the same time the assembly can be accelerated as multiple primary regions are insertable into the recesses simultaneously.

It is provided in a particularly preferred manner that the connection device comprises a collar-shaped secondary region for the positive locking attachment of the brake disk. In the mounted state, the collar-shaped secondary region preferably abuts against the wheel hub by way of one side and against the brake disk by way of the opposite side. A larger connection surface can be provided advantageously for the brake disk by means of the collar-shaped secondary region than is possible with the primary region which is delimited by the recess. In addition, during assembly the secondary region forms a stop which indicates to the fitter that the primary region has been inserted far enough into the recess.

It is provided in a further embodiment of the present invention that the secondary region comprises an adapter-element-side coupling region which interacts in a positive locking manner in the mounted state with a brake-disk-side coupling region which is designed complementarily to the adapter-element-side coupling region, wherein the secondary region is designed preferably in the mounted state in a complementary manner to the brake-disk-side coupling region in a direction extending parallel to the wheel axle and perpendicularly to the wheel axle. For example, on its outer circumference the secondary region includes holding elements which form an undercut, in which, in the mounted state, a complementary rail element engages. In a particularly preferred manner, the adapter-element-side and the brake-disk-side coupling region are designed in the sense of a dovetail connection.

It is provided according to a further embodiment of the present invention that the sleeve-shaped primary region comprises a second cross sectional surface in a primary cutting plane, which extends perpendicularly to the wheel axle with the connection device in the mounted state, and the recess defines a first cross sectional surface by its inner side parallel to the primary cutting plane, wherein the ratio of the first cross sectional surface to the second cross sectional surface assumes a value of between 1.1 and 1.7, in a preferred manner of between 1.1 and 1.45 and particularly preferred of between 1.1 and 1.25. In this case, the first cross sectional surface is determined by the course of the inner side of the recess and the second cross sectional surface by the sleeve interior, i.e. the inner side of the primary region. It has been shown, in this case, that at the ratio of between 1.1 and 1.25 it is possible to provide a wall thickness which, on the one hand, can be comparatively easily deformed for the transfer into the fixed state and at the same time is sufficiently sturdy in order to withstand the loads occurring in operation. It is provided in a preferred manner in this case that the first cross sectional surface is between 60 and 150 $mm^2$ in size. As a result, by designing the primary region with a custom-made clearance fit, it is advantageously possible to provide the primary region with a sufficiently large outside surface, by way of which a non-positive locking attachment to the inner side of the recess is possible.

It is provided in an expedient manner that the collar-shaped secondary region, along a transverse direction which extends substantially perpendicularly to the wheel axle in the mounted state, comprises an extension length which is between 2 and 20 times, preferably between 4 and 15 times and particularly preferred between 5 and 8 times as large as an extension length of the recess measured in the same direction. As a result, the size of the secondary region can be advantageously adjusted in such a manner that comparatively simple fitting is possible during assembly.

It is provided in a preferred manner, in addition, that the primary region extends in a direction running parallel to the wheel axle between 2 and 15 times, preferably between 5 and 13 times and particularly preferred between 8 and 11 times as far as the secondary region. By means of said dimensioning, it can be ensured, on the one hand, that the primary region provides a sufficient potential contact surface for a non-positive locking connection and, on the other hand, that the mounted brake disk is arranged as close as possible to the wheel hub.

In a further embodiment of the present invention, it is provided that the connection device includes a clamping nut or a clamping screw. The clamping nut comprises, in particular, an outside surface which extends in a substantially cone-shaped or truncated-cone-shaped manner, the outside surface comprising on a first end face in the primary cutting plane a first diameter, in particular outside diameter, and on a second end face a second diameter, in particular outside diameter, the outside surface, which extends substantially obliquely to the wheel axle in the mounted state, extending between the first end face and the second end face. In this case, in the mounted state the outside surface preferably extends at an angle of between 2° and 50°, in a preferred manner of between 35° and 45° and particularly preferred of between 5° and 150° in relation to the wheel axle. It is additionally provided that the first diameter is smaller than the second diameter and, in particular, smaller than an inside diameter of the sleeve-shaped primary region, so that during assembly the first end face of the clamping nut is easily able to engage in the opening on the end face of the primary region. In particular, the opening of the sleeve-shaped primary region slides along the outside surface of the clamping nut during assembly. The pressing effect generated, in this case, urges the wall of the sleeve-shaped primary region outward and, as a result, increases the size of the outer circumference, as a result of which the non-positive locking attachment to the inner side of the recess is finally effected. In addition, the clamping nut includes a receiving means, which extends substantially concentrically to its outer surface with an internal thread. It is additionally conceivable for the clamping screw to be a cone screw. In this connection, the clamping screw preferably includes a screw head which is cone-shaped or truncated-cone-shaped at least in part. In particular, the screw head tapers in the direction of a thread, on which a nut is able to be screwed. The part of the screw head which is formed in a cone-shaped or truncated-cone-shaped manner then takes over the above-described functionality of the cone-shaped nut and ensures the provided frictional locking connection to the inner side of the recess.

The connection device expediently includes a rivet or a pin element. In particular, a sleeve-shaped receiving element is conceivable, into which a rivet or a pin element is insertable during the assembly of the connection device. For assembly, for example the sleeve-shaped receiving element is placed in the recess of the wheel hub and then the rivet or the pin element is inserted. It is provided, in this case, that when the rivet or the pin element is pushed in, a wall of the sleeve-shaped receiving element is pressed or arched outward in order to interact in a non-positive locking manner with the inner side of the recess. In order to bring about said arching, the receiving element, on its inner side, comprises, for example, projections which interact with the pin element or the rivet during assembly, in particular in a non-positive locking and/or positive locking manner, and thus are pressed outward. It is conceivable, in addition, that the wall of the sleeve-shaped receiving element comprises a material weakening, for example in the form of a tapering or perforation. Said material weakening is preferably designed in such a manner that it supports a curvature. The site at which the curvature is created during insertion can thus be determined in a targeted manner. It is thus conceivable for the inner side of the recess of the wheel hub to comprise a setback in which the curvature engages once the rivet or the pin element has been inserted. As a result, an additional positive locking closure can be obtained between the recess in the wheel hub and the connection device, in particular the curvature of the connection device. It is additionally provided that the curvature is generated at the end of the receiving element which is sunk in the recess. In particular, a curvature is to be understood as any form of deviation from the cylindrical circumference of the receiving element. It is also conceivable for the receiving element to spread at its end that is sunk in the recess, preferably to spread in a tulip-shaped manner. The advantage of utilizing a pin element or rivet is that a thread is also dispensed with in the case of the connection device and the connection between wheel hub and brake disk can be realized in a comparatively fast manner.

The connection between the wheel hub and the brake disk is preferably effected without a nut, i.e. nut-free. As a result, it is also advantageously possible to save installation space as a place or installation space does not have to be kept free for the nut on one side of the brake disk.

It is preferably provided that the connection device comprises a fixing element which, in the fixed state, reaches through the brake disk and the adapter element. The fixing element, for example, is a screw which abuts against the brake disk by way of its screw head, reaches through the brake disk and the adapter element and during assembly engages in the internal thread or in the receiving means with the internal thread of the clamping screw. As a result of the tightening of the fixing element, the brake disk is fixed and in the recess of the wheel hub the clamping nut is pulled into the opening on the end face of the primary region, as a result of which the enlarging of the outer circumference of the sleeve-shaped primary region and consequently the non-positive attaching to the inner side of the recess is brought about.

In a further embodiment of the present invention, it is provided that the recess extends substantially parallel to the wheel axle, about which the wheel hub is rotatably mounted, in the wheel hub. In this case, a recess which extends substantially parallel to the wheel axle is to be understood, in particular, by the expert as also such that are inclined +/−5° with respect to the wheel axle. The recesses which extend substantially parallel to the wheel axle prove to be particularly advantageous in this case when the connection device comprises multiple primary regions which are then able to be inserted into the recesses in a simple manner at the same time by means of a translational movement which extends parallel to the wheel axle. This proves advantageous, in particular, when the connection device is mounted automatically by means of a robot.

According to a further embodiment of the present invention, it is provided that a material from which the brake disk is produced differs from a material from which the wheel hub is produced, wherein the brake disk is produced in a preferred manner from gray cast iron and/or the wheel hub from a spheroidal graphite iron.

It is provided advantageously that the material of the connection device is designed for thermal isolation between brake disk and wheel hub, and/or wherein the connection device is preferably produced at least in part from a high-grade steel. It is provided, in particular, that the adapter element is produced from a high-grade steel. As a result, effective thermal isolation can be realized between the brake disk and the wheel hub, by means of which thermal uncoupling between the brake disk and the wheel hub is able to be effected. This proves to be particularly advantageous once again on account of the heat or heat development that occurs during braking.

A further object of the present invention is a system produced from a wheel hub, a brake disk and a connection device according to the invention. All features described for the connection device according to the invention and the advantages thereof can also be transferred analogously to the system according to the invention and the other way around.

A further object of the present invention is a method for connecting a brake disk to a wheel hub by means of a connection device according to the invention, said method including the steps: introduce the connection device into a recess of the wheel hub and transfer the connection device into the fixed state in which the connection device acts in a non-positive locking manner with the recess. All features described for the connection device according to the invention and the advantages thereof can also be transferred analogously to the method according to the invention and the other way around.

DETAILED DESCRIPTION OF THE PREFERRED EMBODIMENTS

Figure 1:
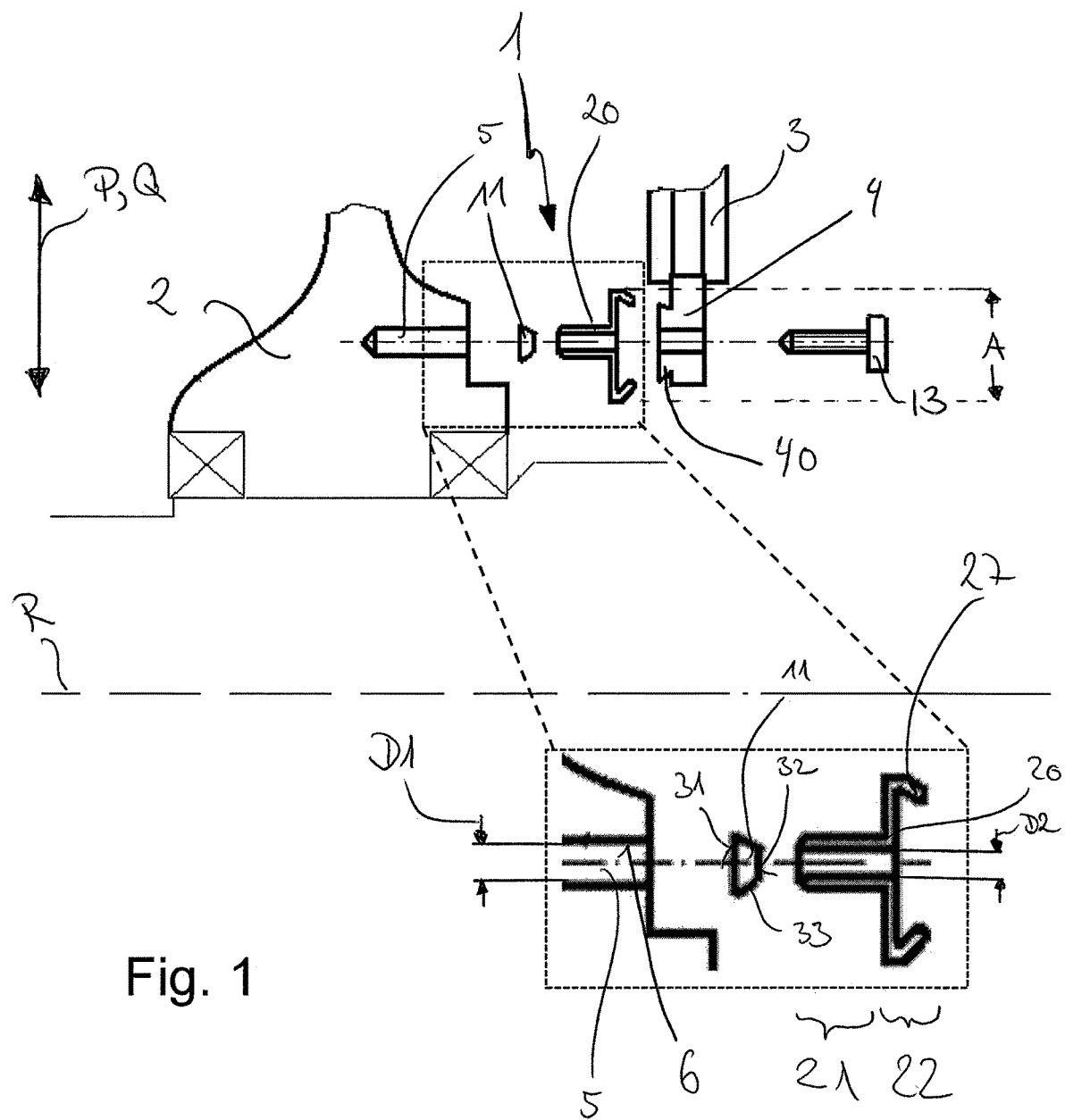
FIG. 1 shows a connection device according to a first embodiment of the present invention as an example.
Figure 3:
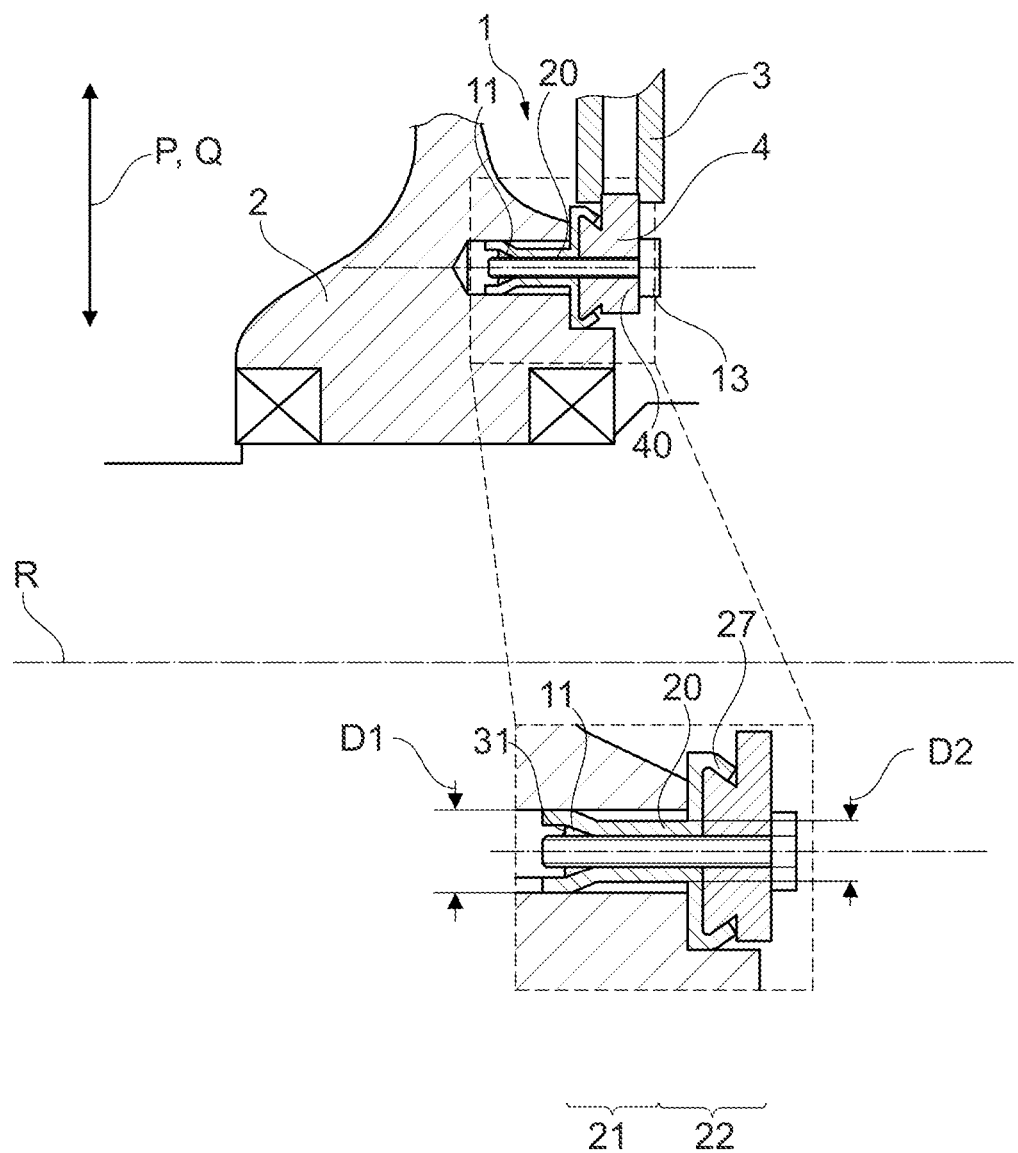
FIG. 3 shows the connection device according to the first embodiment of the present invention in a mounted state.

FIGS. 1 and 3 show a connection device 1 according to a first embodiment of the present invention as an example. The connection device 1, in particular, is such a connection device by way of which a brake disk 3 is non-rotatably connected to a wheel hub 2. The brake disk 3 and the wheel hub 2 are preferably essential component parts of a wheel bearing device for an axle assembly, in particular an axle assembly for a commercial vehicle. In this case, a wheel bearing device can have assigned thereto a wheel axle R, about which the wheel hub 2 and the brake disk 3, which is non-rotatably connected to the wheel hub 2, are mounted so as to be rotatable. As a result of the shear forces acting on the brake disk 3 during braking, comparatively high demands are made on the connection between the brake disk 3 and the wheel hub 2 and consequently on the connection device 1 connecting the brake disk 3 and the wheel hub 2. It is provided, in particular, that the connection device 1 is designed in such a manner that it engages in a recess 5 at least in part in the mounted state. In this connection, it has proved to be particularly advantageous for the production of the wheel hub 2 when it is possible to dispense with the operating step by way of which a thread or an undercut is generated in the recess. In order, nevertheless, to ensure the connection device 1 is fastened in the undercut-free, in particular thread-free recess 5 in the wheel hub 2 in a sufficiently sturdy, permanent manner which is sufficient for the loads, it is provided that the connection device 1 is insertable into the recess 5 in a basic state and the connection device 1, placed at least in part in the recess 5, is transferable into a fixed state in which the connection device 1 interacts in a mounted state with the recess 5 in a non-positive or frictional locking manner in the axial direction, in particular exclusively in a non-positive or frictional locking manner in the axial direction. In particular, the connection device 1 interacts in a non-positive locking manner with an inner side 6 of the recess 5. In addition, it is particularly advantageous when the connection device 1 comprises an adapter element 20 with a sleeve-shaped primary region 21 and a collar-shaped secondary region 22. In this case, the sleeve-shaped primary region 21 is provided for the positive locking attachment to the inner side 6 of the recess 5. To this end, with the connection device 1 in the basic state, an outer circumference of the primary region 21 is designed in such a manner that the primary region 21 is insertable into the recess 5 in a custom-fit manner with play. In particular, the primary region 21 is dimensioned in such a manner that in the mounted state the primary region 21 is sinkable entirely into the recess 5 and the secondary region 22, which connects directly to the primary region 21, abuts flatly against the wheel hub 2 by way of one side.

In order to realize a non-positive locking attachment to the inner side 6 of the recess 5, it is provided, in particular, that an outer circumference of the primary region 21 is enlarged at least in regions when transferring into the fixed state and, as a result, enters into a non-positive locking connection to the inner side 6 of the recess 5. A clamping nut 11, which abuts against the end face of the primary region 21, in particular against the end face of the primary region 21 opposite the secondary region 22, when mounted inside the recess 5, is provided, in particular, for enlarging the outer circumference. During the transfer into the fixed state, the clamping nut 11 is pulled into an end-face opening region of the sleeve-shaped primary region 21, whereupon a wall of the primary region 21 is pressed outward and the non-positive locking connection to the inner side 6 of the recess 5 is thus brought about. In this connection, it is provided in a particularly preferred manner that an outside surface 33 of the clamping nut 11 is designed in the manner of a truncated cone or in a cone-shaped manner. In this case, the clamping nut 11 comprises on a first end face 31 a first diameter D1 and on a second end face 32 opposite the first end face 31 a second diameter D2, an outer surface 33 or outer side, which extends substantially obliquely to the wheel axle R in the mounted state, being provided between the first end face 31 and the second end face 32. In this case, the outer surface 33 extends obliquely in relation to the wheel axis in the mounted state forming an angle of between 2° and 50°, in a preferred manner of between 30° and 45° and particularly preferred of between 5° and 15°. It is provided, in addition, that the first end face 31 fits closely during assembly and the first diameter D1 is smaller than the second diameter D2 and is in particular smaller than an inside diameter of the sleeve-shaped primary region 21 so that the first end face 31 of the clamping nut 11 is easily able to engage in the opening on the end face of the primary region 21 during assembly. In addition, the clamping nut 11 includes a receiving means which extends substantially concentrically to its outer surface 33 with internal thread and in the mounted state and when transferring into the fixed state interacts in a positive locking manner in the axial direction with a fixing element 13 inserted into the sleeve interior. The fixing element 13, in this case, reaches through not only the adapter element 20 but also a connection region 4 of the brake disk 3. In the embodiment shown, the fixing element 13 is a screw, the screw head of which interacts in the mounted state in a positive locking manner with the brake disk 1 in the axial direction.

It is additionally provided that the secondary region 22 is provided for the positive locking attachment of the brake disk 3. In particular, the collar-shaped secondary region 22, on the side facing the brake disk 3, realizes an undercut which interacts in the mounted state in a positive locking manner in the axial direction with a complementarily designed rail element 40. The collar-shaped secondary region 22 is preferably designed complimentarily to the rail element 40 both in a direction which extends axially in the mounted state and in a direction which extends radially in the mounted state. To this end, the secondary region 22, which is designed in a collar-shaped manner, comprises a holding element 27 on its outermost circumference. The holding element 27 is designed in the manner of edging in the present exemplary embodiment and extends in the mounted state, beginning at the outer circumference of the collar-shaped secondary region 22, obliquely to the wheel axle directed radially inwardly.

Figure 2A:
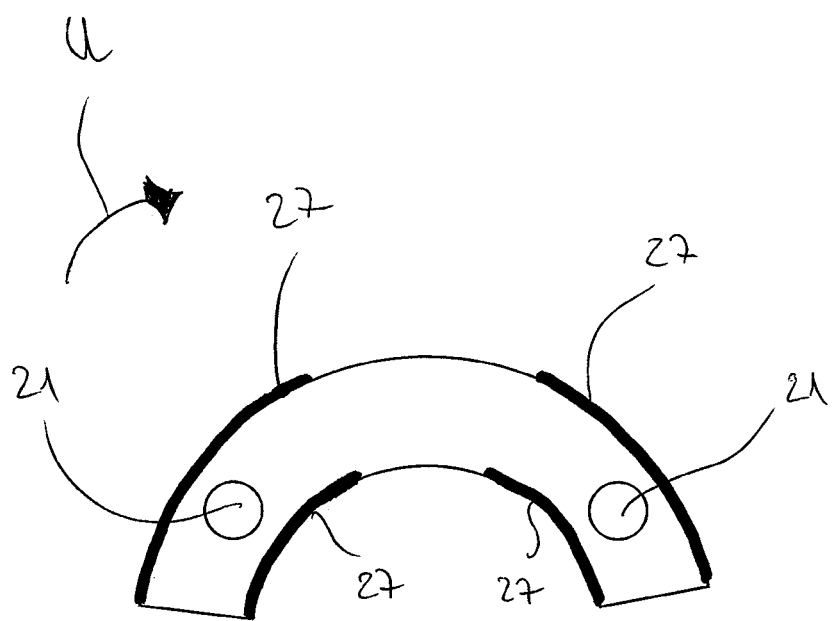
FIG. 2*a* shows a connection device according to a second embodiment of the present invention as an example and which includes an adapter element with mulitple primary regions.
Figure 2B:
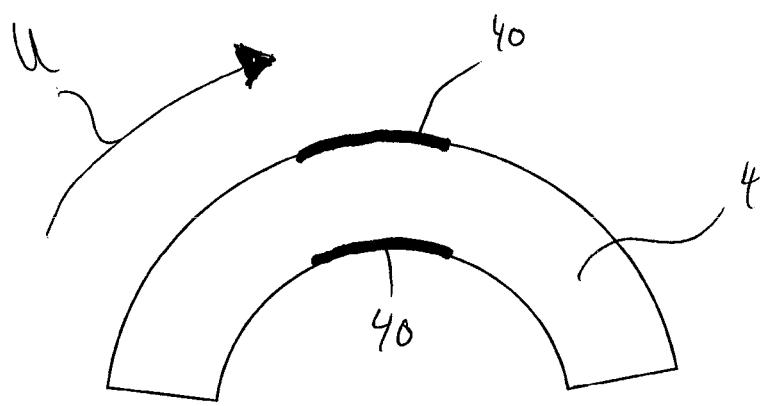
FIG. 2b shows a ring-shaped carrier connecting multiple primary regions.

FIG. 2a shows a connection device 1 according to a second embodiment of the present invention as an example. It is provided, in particular, in this connection that the secondary region 22 is designed as a carrier element 27 with multiple primary regions 21 which are offset to one another when viewed in the circumferential direction, the primary regions 21 which are offset to one another being arranged in such a manner that they are each insertable into a recess 5 at the same time. The holding element 27 of the adapter element 20 and the rail element 40 (FIG. 2b) of the brake disk 3, when seen in the circumferential direction, are interrupted in regions, in this case, in order to make it possible for the rail element 30 of the brake disk 3 to be inserted in the circumferential direction at assembly. In other words, prior to the time of the insertion of the fixing element 13, the brake disk 3 is rotated in relation to the adapter element 20, which is arranged in part in the recess 5, until an opening in the connection region 4 of the brake disk 3 is arranged in alignment with the recess 5 in the wheel hub 2. In a particularly preferred manner, the adapter-element-side and the brake-disk-side coupling regions are designed at least in regions in the sense of a dovetail connection.

LIST OF REFERENCES

1 Connection device
2 Wheel hub
3 Brake disk
4 Connection region
5 Recess
6 Inner side
11 Clamping nut
13 Fixing element
20 Adapter element
21 Primary region
22 Secondary region
27 Holding element
31 Second end face
32 First end face
33 Outer side
40 Rail element
D1 First cross sectional surface
D2 Second cross sectional surface
A Length of extension
P Primary cutting plane
Q Transverse direction

The invention claimed is:

1. A brake arrangement, comprising:
 a connection device is configured to be arranged at least in part in a recess of a wheel hub and that is transferable into a fixed state in which the connection device is configured to interact in a non-positive locking manner with the recess to connect a brake disk to the wheel hub, wherein the connection device includes a clamping nut, having an outer side that is configured as a truncated cone and/or is cone-shaped.

2. The brake arrangement as claimed in claim 1, wherein the connection device comprises a collar-shaped region configured for the positive locking attachment of the brake disk.

3. The brake arrangement as claimed in claim 2, wherein a sleeve-shaped region comprises a cross sectional surface in a primary cutting plane which extends perpendicularly to a wheel axle with the connection device in the mounted state and the recess defines a first cross sectional surface by an inside that is parallel to the primary cutting plane, and wherein the ratio of the first cross sectional surface to the second cross sectional surface is between 1.1 and 1.7.

4. The brake arrangement of claim 3, wherein the ratio is between 1.1 and 1.45.

5. The brake arrangement of claim 4, wherein the ratio is between 1.1 and 1.25.

6. The brake arrangement as claimed in claim 1, wherein the brake arrangement includes the wheel hub, and the recess in the wheel hub is free of undercuts, and wherein the connection device is insertable into the recess in a basic state.

7. The brake arrangement as claimed in claim 3, wherein the wheel hub is free of threads.

8. The brake arrangement as claimed in claim 1, wherein the connection device comprises an adapter element configured for positive locking attachment of the brake disk to the connection device.

9. The brake arrangement as claimed in claim 8, wherein the adapter element comprises a sleeve-shaped primary region for insertion into the recess.

10. The brake arrangement as claimed in claim 1, wherein the recess is one of multiple recesses, the connection device includes an adapter element with multiple primary regions, and wherein the primary regions are each insertable into at least one of the recess.

11. The brake arrangement as claimed in claim 10, wherein the multiple primary regions are connected to one another by a ring-shaped carrier element.

12. A brake arrangement, including a connection device as claimed in claim 1, the brake disk and the wheel hub, wherein the brake disk comprises a first material and the wheel hub comprises a second material that is different than the first material, wherein the first material comprises gray cast iron and/or the second material comprises a spheroidal graphite iron.

13. The brake arrangement as claimed in claim 12, wherein the connection device comprises at least one of a material configured for thermal insulation between brake disk and wheel hub and steel.

14. The brake arrangement as claimed in claim 1, wherein the connection device includes at least one of a rivet and a pin element.

15. The brake arrangement as claimed in claim 1, wherein the connection device comprises a fixing element which, in the fixed state, is configured to reach through the brake disk and an adapter element.

16. The brake arrangement as claimed in claim 1, wherein the recess in the wheel hub extends substantially parallel to a wheel axle about which the wheel hub is configured to be rotatably mounted.

17. A method for connecting the brake disk to the wheel hub by the connection device as claimed in claim 1, the method including introducing the connection device into a recess of the wheel hub and moving the connection device into the fixed state in which the connection device acts in a non-positive locking manner with the recess.

18. A brake arrangement, comprising:
 a brake disk;
 a wheel hub that includes at least one recess; and
 a connection device configured to be arranged in the at least one recess and that is moveable to a fixed state in which the connection device is configured to interact in a non-positive locking manner with the at least one recess to connect the brake disk to the wheel hub, wherein the connection device includes a clamping nut having an outer side that is configured as a truncated cone and/or is cone-shaped.

19. The brake arrangement of claim 18, wherein the wheel hub is free of threads.

20. The brake arrangement of claim 18, wherein the connection device includes an adapter element that positively locks the brake disk to the connection device.

* * * * *

UNITED STATES PATENT AND TRADEMARK OFFICE
CERTIFICATE OF CORRECTION

PATENT NO. : 11,174,909 B2
APPLICATION NO. : 16/498173
DATED : November 16, 2021
INVENTOR(S) : Weber It is certified that error appears in the above-identified patent and that said Letters Patent is hereby corrected as shown below:

In the Specification

Column 4, Lines 1, 4, 6 (2×), 9-10, 11, 19:
"cross sectional" should be – cross-sectional –

Column 9, Line 31, 32:
"cross sectional" should be – cross-sectional –

In the Claims

Column 9, Claim 3, Lines 52, 55, 57, 58:
"cross sectional" should be – cross-sectional –

Column 10, Claim 7, Line 4:
"3" should be – 6 –

Column 10, Claim 10, Line 17:
"recess" should be – recesses –

Signed and Sealed this
Fourteenth Day of June, 2022

Katherine Kelly Vidal
*Director of the United States Patent and Trademark Office*